United States Patent
Xu et al.

(10) Patent No.: US 11,443,621 B2
(45) Date of Patent: Sep. 13, 2022

(54) METHOD AND APPARATUS FOR ADJUSTING CHANNELIZATION OF TRAFFIC INTERSECTION

(71) Applicant: BEIJING BAIDU NETCOM SCIENCE AND TECHNOLOGY CO., LTD., Beijing (CN)

(72) Inventors: Qiqi Xu, Beijing (CN); Fan Yang, Beijing (CN); Yongyi Sun, Beijing (CN); Chengfa Wang, Beijing (CN); Xuan Huang, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 6 days.

(21) Appl. No.: 17/115,328

(22) Filed: Dec. 8, 2020

(65) Prior Publication Data

US 2021/0358298 A1 Nov. 18, 2021

(30) Foreign Application Priority Data

May 14, 2020 (CN) .......................... 202010408094.1

(51) Int. Cl.
*G08G 1/056* (2006.01)
*G08G 1/081* (2006.01)
(Continued)

(52) U.S. Cl.
CPC ............ *G08G 1/056* (2013.01); *G06V 20/40* (2022.01); *G06V 20/54* (2022.01); *G08G 1/081* (2013.01); *G01S 19/393* (2019.08)

(58) Field of Classification Search
None
See application file for complete search history.

(56) References Cited

U.S. PATENT DOCUMENTS

| 5,208,585 | A | 5/1993 | Sprague |
| 6,262,673 | B1 * | 7/2001 | Kalina ............ G08G 1/096758 340/916 |

(Continued)

FOREIGN PATENT DOCUMENTS

| CN | 101404121 A | 4/2009 |
| CN | 203596107 A | 5/2014 |

(Continued)

OTHER PUBLICATIONS

Guo Yan-Yong et al., "Design approach of channelized island based on traffic conflict models at signalized intersection", Journal of Traffic and Transportation Engineering, pp. 140-148, vol. 17, No. 4, Aug. 2017.

(Continued)

*Primary Examiner* — Fekadeselassie Girma
(74) *Attorney, Agent, or Firm* — Novick, Kim & Lee, PLLC; Zhi Yang Xue; Jihun Kim

(57) ABSTRACT

A method and apparatus for adjusting channelization of a traffic intersection are proposed. The specific implementation of the method is: obtaining a first traffic characteristic of vehicles at each of a plurality of target positions in a process of vehicles in a target traveling direction traveling through the traffic intersection from upstream to downstream in a preset first time period; generating first traffic change information of the traffic intersection based on the first traffic characteristic at each of the plurality of target positions; and in response to that the first traffic change information satisfies a preset first change distribution, generating channelization adjustment information for non-motorized vehicle lanes of the traffic intersection.

12 Claims, 6 Drawing Sheets

(51) Int. Cl.
*G06V 20/40* (2022.01)
*G06V 20/54* (2022.01)
*G01S 19/39* (2010.01)

(56) References Cited

U.S. PATENT DOCUMENTS

| | | | | |
|---|---|---|---|---|
| 6,269,304 | B1* | 7/2001 | Kaji | G01C 21/3658 |
| | | | | 701/428 |
| 8,101,903 | B2* | 1/2012 | Mokhnatyuk | G03H 1/04 |
| | | | | 257/435 |
| 8,823,556 | B2* | 9/2014 | Yester | G08G 1/0967 |
| | | | | 340/995.13 |
| 9,576,485 | B2* | 2/2017 | Gao | G08G 1/095 |
| 10,176,712 | B1* | 1/2019 | Martins | G08G 1/07 |
| 10,308,172 | B2* | 6/2019 | Suzuki | G08G 1/005 |
| 10,388,152 | B2* | 8/2019 | Biehle | G08G 1/096758 |
| 10,713,817 | B2* | 7/2020 | Oliva-Perez | G06T 7/90 |
| 10,832,570 | B1* | 11/2020 | Ibrahim | G08G 1/096838 |
| 10,943,472 | B2* | 3/2021 | Morimura | G08G 1/005 |
| 10,984,275 | B1* | 4/2021 | Campbell | G06V 20/46 |
| 11,055,991 | B1* | 7/2021 | Mulligan | G08G 1/095 |
| 11,235,776 | B2* | 2/2022 | Gunaratne | B60W 60/007 |
| 2005/0268566 | A1* | 12/2005 | Park | E04H 6/10 |
| | | | | 52/173.1 |
| 2006/0267795 | A1* | 11/2006 | Draaijer | G08G 1/04 |
| | | | | 340/907 |
| 2007/0276600 | A1* | 11/2007 | King | G08G 1/0962 |
| | | | | 340/436 |
| 2007/0296610 | A1* | 12/2007 | Heffernan | G08G 1/095 |
| | | | | 340/929 |
| 2008/0012726 | A1* | 1/2008 | Publicover | G08G 1/096725 |
| | | | | 340/932 |
| 2009/0273486 | A1* | 11/2009 | Sitbon | G08G 1/095 |
| | | | | 340/907 |
| 2011/0080306 | A1* | 4/2011 | Leopold | G08G 1/04 |
| | | | | 340/936 |
| 2011/0298603 | A1* | 12/2011 | King | G08G 1/042 |
| | | | | 340/436 |
| 2012/0044090 | A1* | 2/2012 | Kahler | B60Q 1/50 |
| | | | | 340/905 |
| 2013/0011190 | A1* | 1/2013 | Gingrich, Sr. | E01C 1/04 |
| | | | | 404/1 |
| 2013/0271292 | A1* | 10/2013 | McDermott | G08G 1/096758 |
| | | | | 340/905 |
| 2015/0153184 | A1* | 6/2015 | Mudalige | G01C 21/26 |
| | | | | 701/523 |
| 2015/0348388 | A1* | 12/2015 | Teller | G03B 17/54 |
| | | | | 340/937 |
| 2016/0148508 | A1* | 5/2016 | Morimoto | B60K 35/00 |
| | | | | 701/117 |
| 2017/0243485 | A1* | 8/2017 | Rubin | H04W 4/12 |
| 2019/0347821 | A1* | 11/2019 | Stein | G08G 1/0129 |
| 2020/0118427 | A1 | 4/2020 | Xianghong et al. | |
| 2021/0019376 | A1* | 1/2021 | Neubauer | G08G 1/081 |
| 2021/0064902 | A1* | 3/2021 | Connell | G06V 20/54 |
| 2021/0095975 | A1* | 4/2021 | Mubarek | G08G 1/096775 |
| 2021/0150893 | A1* | 5/2021 | Mubarek | G08G 1/0133 |
| 2021/0174669 | A1* | 6/2021 | Guan | G08G 1/04 |
| 2022/0009452 | A1* | 1/2022 | Arunmozhi | B60S 1/56 |
| 2022/0013014 | A1* | 1/2022 | Xu | H04W 4/40 |
| 2022/0018674 | A1* | 1/2022 | Xu | G06Q 10/08355 |

FOREIGN PATENT DOCUMENTS

| | | |
|---|---|---|
| CN | 203596107 U | 5/2014 |
| CN | 104376725 A | 2/2015 |
| CN | 105133450 A | 12/2015 |
| CN | 106875699 A | 6/2017 |
| CN | 109584564 A | 4/2019 |
| CN | 109598928 A | 4/2019 |
| CN | 109920251 A | 6/2019 |
| CN | 110570658 A | 12/2019 |

OTHER PUBLICATIONS

Iapichino Giuliana, "Search Report for EP application 20213390.6", dated May 7, 2021, EPO, Germany.
CNIPA Examiner, "OA for CN application 202010408094.1", Mar. 23, 2021, CNIPA, China.
Du Shuai, "Office Action for CN Application No. 202010408094.1", dated Sep. 30, 2021, CNIPA, China.

* cited by examiner

METHOD AND APPARATUS FOR ADJUSTING CHANNELIZATION OF TRAFFIC INTERSECTION

CROSS REFERENCE TO RELATED APPLICATION

This application is based on and claims priority to Chinese patent application No. 202010408094.1, filed on May 14, 2020, the entire content of which is hereby introduced into this application as a reference.

FIELD

The present disclosure relates to the field of intelligent transportation technologies in data processing, and more particularly, to a method and apparatus for adjusting channelization of a traffic intersection.

BACKGROUND

With increasing of vehicle ownership, urban traffic roads are developing faster and faster. In order to meet traffic needs of pedestrians and different kinds of vehicles, road networks will be channelized. For example, traffic islands, bus stops, green belts, traffic markings, and signs may be set to disperse and guide road traffic flow, so as to realize smooth traffic and improve road traffic capacity.

SUMMARY

According to a first aspect, a method for adjusting channelization of a traffic intersection is provided. The method includes: obtaining a first traffic characteristic of vehicles at each of a plurality of target positions in a process of vehicles in a target traveling direction traveling through the traffic intersection from upstream to downstream in a preset first time period; generating first traffic change information of the traffic intersection based on the first traffic characteristic at each of the plurality of target positions; and in response to that the first traffic change information satisfies a preset first change distribution, generating channelization adjustment information for non-motorized vehicle lanes of the traffic intersection.

According to a second aspect, an electronic device is provided. The electronic device includes at least one processor and a storage device communicatively connected to the at least one processor. The memory stores an instruction executable by the at least one processor. When the instruction is executed by the at least one processor, the at least one processor may implement a method for adjusting channelization of the traffic intersection. The method includes: obtaining a first traffic characteristic of vehicles at each of a plurality of target positions in a process of vehicles in a target traveling direction traveling through the traffic intersection from upstream to downstream in a preset first time period; generating first traffic change information of the traffic intersection based on the first traffic characteristic at each of the plurality of target positions; and in response to that the first traffic change information satisfies a preset first change distribution, generating channelization adjustment information for non-motorized vehicle lanes of the traffic intersection.

According to a third aspect, a non-transitory computer-readable storage medium having a computer instruction stored thereon is provided. The computer instruction is configured to make a computer implement a method for adjusting channelization of the traffic intersection. The method includes: obtaining a first traffic characteristic of vehicles at each of a plurality of target positions in a process of vehicles in a target traveling direction traveling through the traffic intersection from upstream to downstream in a preset first time period; generating first traffic change information of the traffic intersection based on the first traffic characteristic at each of the plurality of target positions; and in response to that the first traffic change information satisfies a preset first change distribution, generating channelization adjustment information for non-motorized vehicle lanes of the traffic intersection.

It should be understood that the summary is not intended to identify key or important features of embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for a better understanding of the solution and do not constitute a limitation to the present disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

In order to solve the above technical problem, the present disclosure proposes a way that may intelligently detect unreasonable channelization of non-motorized vehicle lanes.

Figure 1:
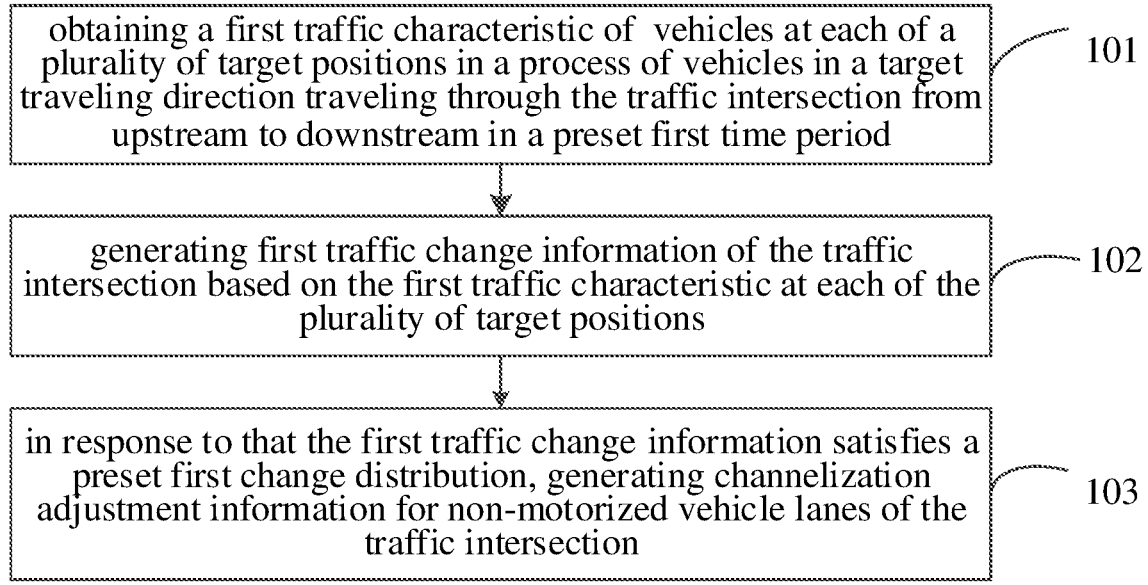
FIG. 1 is a flowchart of a method for adjusting channelization of a traffic intersection according to Embodiment 1 of the present disclosure.

In detail, FIG. 1 is a flowchart of a method for adjusting channelization of a traffic intersection according to Embodiment 1 of the present disclosure. As illustrated in FIG. 1, the method includes the following.

At block 101, a first traffic characteristic of vehicles at each of multiple target positions in a process of vehicles in a target traveling direction traveling through the traffic intersection from upstream to downstream in a preset first time period is obtained.

It is easy to understand that traffic congestion may be reflected by traffic characteristics of peak traveling time periods. Therefore, in order to determine whether the traffic flow is smooth, in embodiments of the present disclosure, the first traffic characteristic of the vehicles at each of the multiple target positions in the process of vehicles in the target traveling direction traveling through the traffic intersection from upstream to downstream in the preset first time period is obtained. The first time period may be understood as a time period relatively appearing peak traveling (or a time period with a relatively high traffic volume), such as 8-10 a.m., or 5-8 p.m. The target traveling direction may be understood as a traveling direction of a current lane to be detected. The target traveling direction may be actively selected by a user, or may be determined based on the position and type of channelization in each traveling direction. On the basis of the position and type of the channelization in each traveling direction, a risk level of traffic congestion caused by the channelization in each traveling direction is analyzed, and a traveling direction of a lane with a higher risk level is determined as the target traveling direction.

In addition, the first traffic characteristic may include one or more of traffic speed, traffic acceleration, and a time difference between a time point when a current vehicle traveling through and a time point when an in-front vehicle traveling through. The multiple target positions may be upstream, downstream, or in the middle of the traffic intersection.

It should be noted that in different application scenes, different methods of obtaining the first traffic characteristic at each of the multiple target positions in the process of the vehicles in the target traveling direction traveling through the traffic intersection from upstream to downstream in the preset first time period are exemplified as follows.

Embodiment 1

Figure 2:
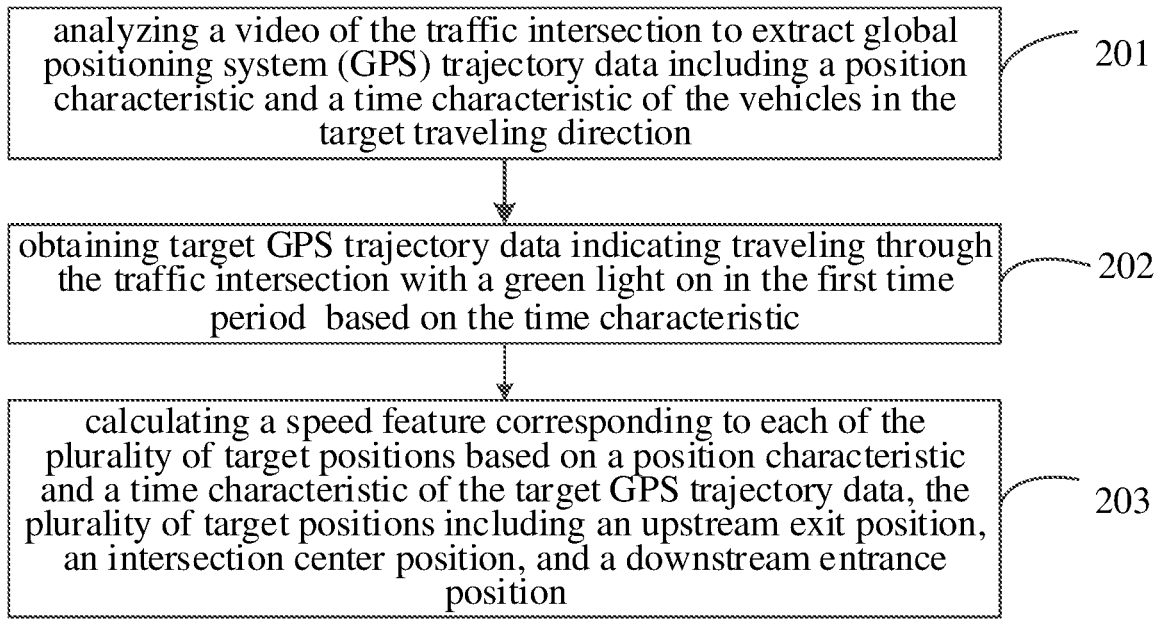
FIG. 2 is a flowchart of a method for adjusting channelization of a traffic intersection according to Embodiment 2 of the present disclosure.

In the embodiment, the first traffic characteristic includes a speed characteristic. As illustrated in FIG. 2, the above block 101 includes the following.

At block 201, a video of the traffic intersection is analyzed to extract global positioning system (GPS) trajectory data including a position characteristic and a time characteristic of the vehicles in the target traveling direction.

In detail, a video of the traffic intersection to be analyzed is obtained, and the video of the traffic intersection of the target traveling direction is analyzed. The GPS trajectory data of multiple vehicles in the target traveling direction and traveling through the traffic intersection in the preset first time period is extracted. In order to facilitate subsequent analysis, the GPS trajectory data includes a position characteristic and a time characteristic. The position characteristic includes a position of a vehicle relative to the traffic intersection when the vehicle is traveling, such as a position located upstream of the traffic intersection, a position located downstream of the traffic intersection.

In addition, the above-mentioned time characteristic may be obtained based on video time in the video.

It is understandable that the GPS trajectory data corresponds to multiple traveling vehicles in the target traveling direction. In the embodiment, a license plate number of each vehicle is identified. A road position (position characteristic) covered by a trajectory of each vehicle traveling in the preset first time period and a time point (time characteristic) traveling through the road are extracted based on the license plate number. The time point traveling through the road may be determined based on a time point in the video.

At block 202, target GPS trajectory data indicating traveling through the traffic intersection with a green light on in the first time period is obtained based on the time characteristic.

In detail, obtaining the target GPS trajectory data indicating traveling through the traffic intersection with a green light on in the first time period based on the time characteristic means extracting GPS trajectory data corresponding to a period that the green light being on in the first time period.

At block 203, a speed characteristic corresponding to each of the multiple target positions is obtained based on a position characteristic and a time characteristic of the target GPS trajectory data. The multiple target positions include an upstream exit position, an intersection center position, and a downstream entrance position.

In detail, the speed characteristic corresponding to each of the multiple target positions is obtained based on the position characteristic and the time characteristic of the target GPS trajectory data. The multiple target positions include the upstream exit position, the intersection center position, and the downstream entrance position. The GPS trajectory data of the target position may be matched based on the position characteristic, and the corresponding speed characteristic may be determined based on an instantaneous speed detected at a corresponding time point.

The speed characteristic may be obtained in the following manner. A corresponding time point is obtained to analyze a distance traveled by each vehicle in the video and a time taken for traveling the distance. And then, the speed characteristic is determined based on a ratio of the distance to the time.

Embodiment 2

In this embodiment, the first traffic characteristic includes a time difference of traveling between a current vehicle and an in-front vehicle. Consequently, for each vehicle, a time point at which the vehicle traveling through the target position may be obtained. For example, the time point of traveling through the target position may be determined based on matching time points recorded by a driving recorder with positions each vehicle traveled through. For each vehicle, the license plate number of its in-front vehicle that traveling through the target position is obtained. The license plate number of the in-front vehicle of each vehicle is recorded by the driving recorder and reported by each vehicle. The time difference of traveling through the target position between each vehicle and its in-front vehicle may be determined according to the time point at which each vehicle traveling through the target position and the license plate number of each vehicle's in-front vehicle that traveling through the target position.

At block 102, first traffic change information of the traffic intersection is generated based on the first traffic characteristic at each of the plurality of target positions.

As analyzed above, the first traffic characteristic at each target position reflects traffic conditions. Therefore, the first traffic change information of the traffic intersection is generated based on the first traffic characteristic at each of the plurality of target positions, and the first traffic change information reflects changes of the traffic at the plurality of target positions. In different application scenes, contents corresponding to the first traffic characteristic are different, and then resulting in different first traffic change information. In some possible embodiments, when the first traffic characteristic is the speed characteristic, the corresponding first traffic change information is a speed change condition of the vehicle traveling through different target positions.

Figure 3:
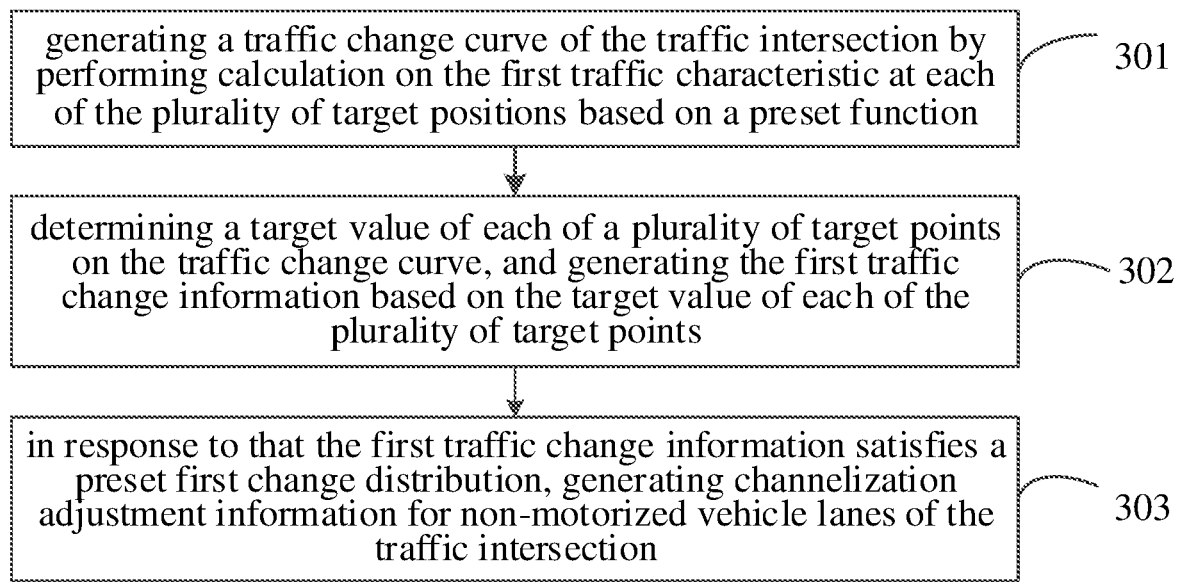
FIG. 3 is a flowchart of a method for adjusting channelization of a traffic intersection according to Embodiment 3 of the present disclosure.

It should be noted that in different application scenes, the manners of generating the first traffic change information of the traffic intersection based on the first traffic characteristic at each of the plurality of target positions are different. As a possible implementation, as illustrated in FIG. 3, the block 102 includes the following.

At block 301, a traffic change curve of the traffic intersection is generated by performing calculation on the first traffic characteristic at each of the plurality of target positions based on a preset function.

In detail, the traffic change curve of the traffic intersection is generated by performing calculation on the first traffic characteristic at each of the plurality of target positions based on the preset function. Variables of the preset function are target positions and the first traffic characteristic. The multiple target positions and the first traffic characteristic are inputted to the preset function to obtain the value of each reference point. The traffic change curve of the traffic intersection is generated based on values of each reference point.

In the embodiment, a first corresponding relationship between the first traffic characteristic at each target position and the traffic change curve may also be preset. The traffic change curve of the traffic intersection may be determined based on the first corresponding relationship.

At block 302, a target value of each of a plurality of target points on the traffic change curve is determined. The first traffic change information is generated based on the target value of each of the plurality of target points.

In detail, the target value of each of the plurality of target points on the traffic change curve is determined. The first traffic change information is generated based on the target value of each of the plurality of target points. Consequently, analyzing based on the change curve improves the reliability of determining the first traffic change information.

Figure 4:
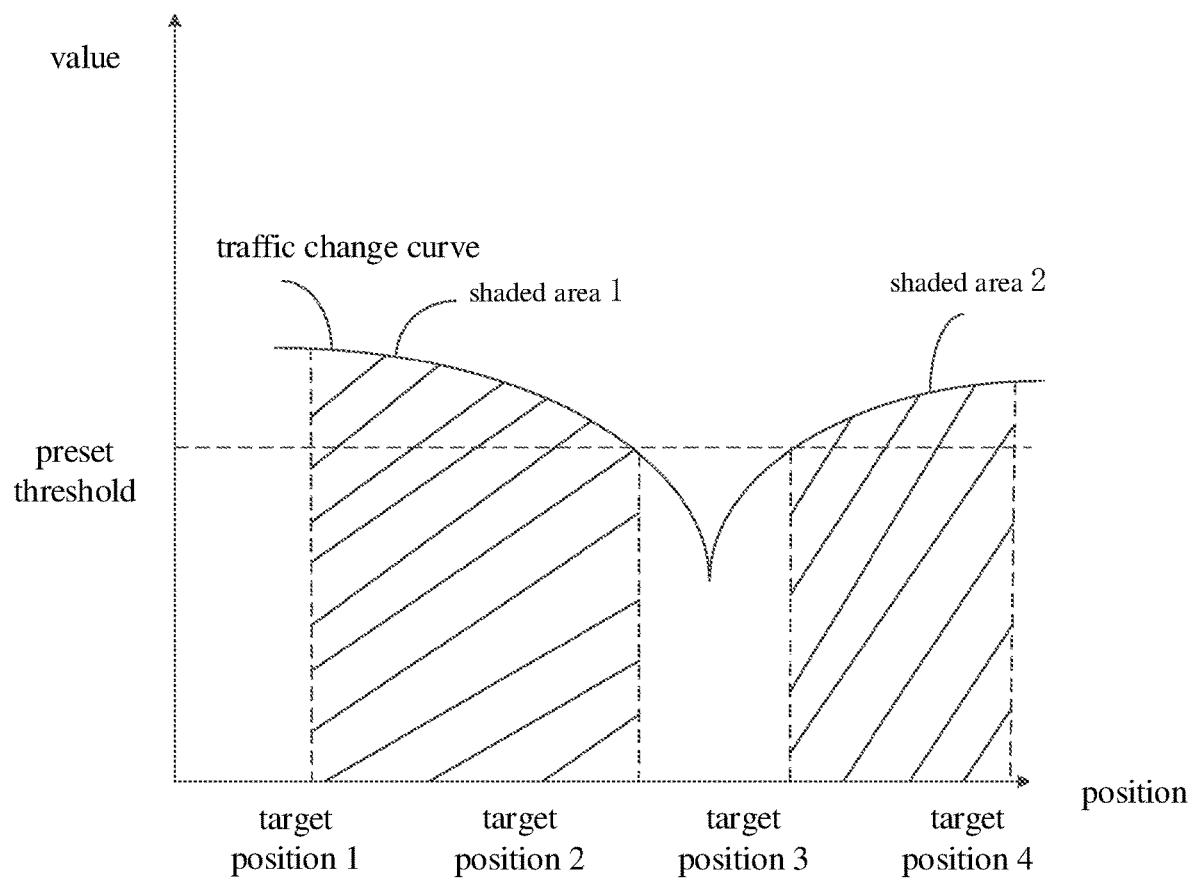
FIG. 4 is a schematic diagram illustrating a scene for determining first traffic change information according to Embodiment 4 of the present disclosure.
Figure 5:
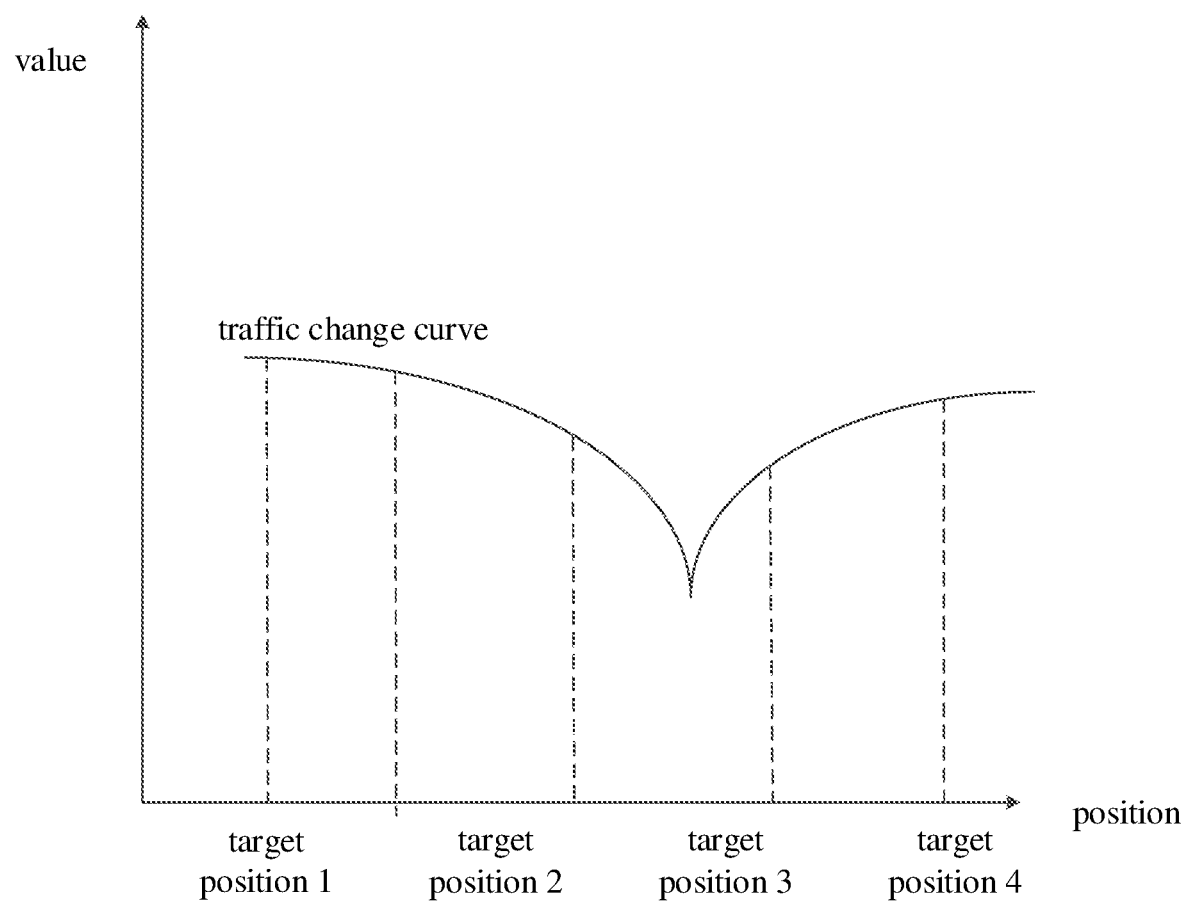
FIG. 5 is a schematic diagram illustrating a scene for determining first traffic change information according to Embodiment 5 of the present disclosure.

It should be noted that in different application scenes, the above target points contain different meanings. For example, when the traffic change curve is as illustrated in FIG. 4, continue to refer to FIG. 4. At each target position (one target position corresponds to multiple positions, for example, the downstream of the traffic intersection corresponds to multiple positions located downstream), a point with the first traffic characteristic being less than a preset threshold is determined as the target point. An area of a shaded area corresponding to the target point is used as the first traffic change information. For another example, as illustrated in FIG. 5, when the traffic change curve is as illustrated in FIG. 4, reference may be made to FIG. 5. A value corresponding to each target position is determined as the target point. A weighted average is performed on a slope (not shown in the figure) of each target point to determine the first traffic change information.

At block 103, in response to that the first traffic change information satisfies a preset first change distribution, channelization adjustment information for non-motorized vehicle lanes of the traffic intersection is generated.

In detail, the preset first change distribution is set in advance. The first change distribution corresponds to an unreasonable change distribution of non-motorized vehicle channelization settings. Consequently, when the first traffic change information satisfying the preset first change distribution is determined, the channelization adjustment information for non-motorized vehicle lanes of the traffic intersection is generated. The channelization adjustment information for non-motorized vehicle lanes may include adjustment prompting information for the channelization of non-motorized vehicle lanes, so that relevant personnel may eliminate unreasonable designs of the channelization of non-motorized vehicle lanes. The channelization adjustment information for non-motorized vehicle lanes may also be adjustment advice based on the channelization of non-motorized vehicle lanes. The adjustment advice includes changes of the position or type of the canalization, etc. The adjustment advice may be generated in advance based on the analysis of big data.

Figure 6:
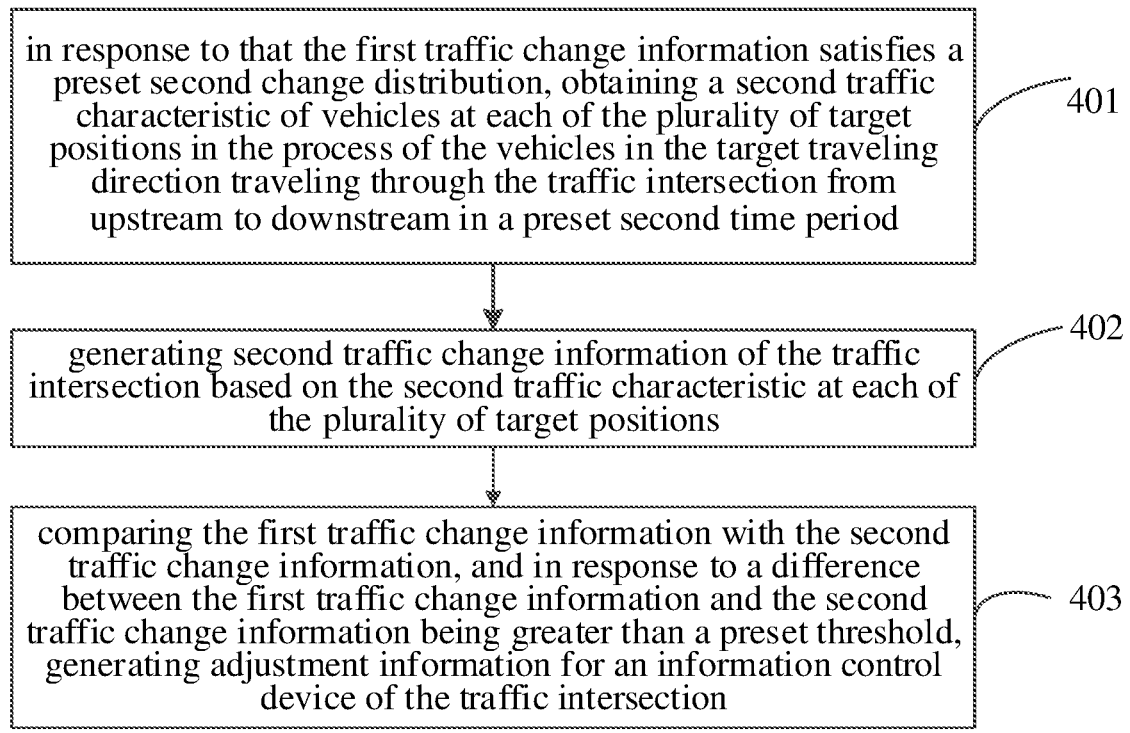
FIG. 6 is a flowchart of a method for adjusting channelization of a traffic intersection according to Embodiment 6 of the present disclosure.

Of course, in the actual implementation process, in some cases, the traffic congestion may not be caused by unreasonable channelization designs, but by an unreasonable duration of the green light of an information control device. Therefore, in an embodiment of the present disclosure, as illustrated in FIG. 6, after step 103, the method further includes the following.

At block 401, in response to that the first traffic change information satisfies a preset second change distribution, a second traffic characteristic of vehicles at each of the plurality of target positions in the process of the vehicles in the target traveling direction traveling through the traffic intersection from upstream to downstream in a preset second time period is obtained.

In detail, when the first traffic change information satisfies the preset second change distribution, the preset second change distribution corresponds to a change that occurs due to an unreasonable design of a designed duration of signal control lights of the information control device. Therefore, in order to further verify whether traffic congestion is caused by the unreasonable design of the information control device, the second traffic characteristic at each of the plurality of target positions in the process of the vehicles in the target traveling direction traveling through the traffic intersection from upstream to downstream in the preset second time period is obtained. The second time period may be an off-peak traveling time period (or a time period with a relatively low traffic volume) such as 0:00 to 6:00 am. The second traffic characteristic may be the same as the first traffic characteristic, which will not be repeated here.

At block 402, second traffic change information of the traffic intersection is generated based on the second traffic characteristic at each of the plurality of target positions.

In detail, the second traffic change information of the traffic intersection is generated based on the second traffic characteristic at each of the plurality of target positions. The manners of generating the second traffic change information of the traffic intersection based on the second traffic characteristic at each of the plurality of target positions are similar to the manners of generating the first traffic change information of the traffic intersection based on the first traffic characteristic at each of the plurality of target positions, and thus will not be repeated here.

At block 403, the first traffic change information is compared with the second traffic change information. In response to a difference between the first traffic change information and the second traffic change information being greater than a preset threshold, adjustment information for an information control device of the traffic intersection is generated.

In detail, the first traffic change information is compared with the second traffic change information. In response to the difference between the first traffic change information and the second traffic change information being greater than the preset threshold, it is indicated that the traffic congestion in the target traveling direction is caused by the unreasonable design of the information control device. Consequently, the adjustment information for the information control device of the traffic intersection is generated.

In practical applications, various methods may be used to generate the adjustment information for the information control device. As a possible implementation, a difference result between the difference and the preset threshold is calculated, and a preset second corresponding relationship between the difference result and increased duration of the green light being on is queried. The increased duration of the green light being on is determined based on the second corresponding relationship. Therefore, the adjustment information for the information control device of the traffic intersection includes the correspondingly increased duration of the green light being on.

As another possible implementation, a product value of the difference and a preset adjustment coefficient is calculated, and a preset third corresponding relationship between the product value and increased duration of the green light being on is queried. The increased duration of the green light being on is determined based on the third corresponding relationship. Therefore, the adjustment information for the information control device of the traffic intersection includes the correspondingly increased duration of the green light being on.

In an embodiment of the present disclosure, if the above difference is less than or equal to the preset threshold, it is indicated that traffic congestion of the traffic intersection is not caused by the information control device, but by the lane, such as an unreasonable traveling direction of the lane. Therefore, the adjustment information of the traffic intersection is generated. For example, an absolute value of the difference result between the difference and the preset threshold is calculated. On the basis of the target traveling direction and the absolute value of the difference result, information of increased quantity about the traveling direction of the lane in the target traveling direction is generated.

In summary, with the method for adjusting the channelization of the traffic intersection according to embodiments of the present disclosure, the first traffic characteristic at each of the plurality of target positions in the process of the vehicles in the target traveling direction traveling through the traffic intersection from upstream to downstream in the preset first time period is obtained. The first traffic change information of the traffic intersection is generated based on the first traffic characteristic at each of the plurality of target positions. In response to that the first traffic change information satisfies the preset first change distribution, the channelization adjustment information for the non-motorized vehicle lanes of the traffic intersection is generated. Consequently, the intelligent detection of an unreasonable traffic direction of channelization of the non-motorized vehicle lanes is realized without manual work, and the efficiency of the channelization adjustment for the non-motorized vehicle lanes is improved.

Figure 7:
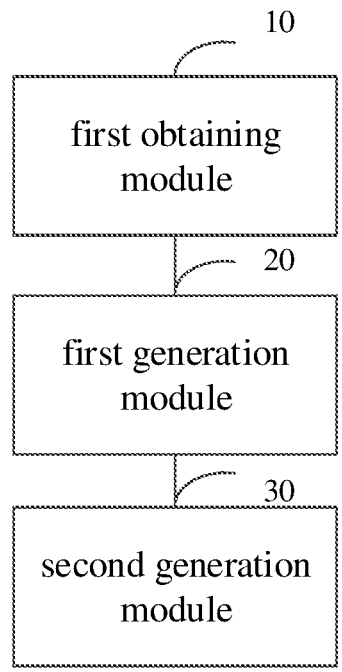
FIG. 7 is a block diagram illustrating an apparatus for adjusting channelization of a traffic intersection according to Embodiment 7 of the present disclosure.

To implement the above embodiments, the present disclosure further provides an apparatus for adjusting channelization of a traffic intersection. FIG. 7 is a block diagram illustrating an apparatus for adjusting channelization of a traffic intersection according to an embodiment of the present disclosure. As illustrated in FIG. 7, the apparatus for adjusting channelization of the traffic intersection includes a first obtaining module 10, a first generation module 20 and a second generation module 30.

The first obtaining module 10 is configured to obtain a first traffic characteristic of vehicles at each of a plurality of target positions in a process of vehicles in a target traveling direction traveling through the traffic intersection from upstream to downstream in a preset first time period.

In an embodiment of the present disclosure, the first obtaining module 10 is configured to: analyze a video of the traffic intersection to extract global positioning system (GPS) trajectory data including a position characteristic and a time characteristic of the vehicles in the target traveling direction; obtain target GPS trajectory data indicating traveling through the traffic intersection with a green light on in the first time period based on the time characteristic; and calculate a speed characteristic corresponding to each of the plurality of target positions based on a position characteristic and a time characteristic of the target GPS trajectory data. The plurality of target positions includes an upstream exit position, an intersection center position, and a downstream entrance position.

The first generation module 20 is configured to generate first traffic change information of the traffic intersection based on the first traffic characteristic at each of the plurality of target positions.

In an embodiment of the present disclosure, the first generation module 20 is configured to: generate a traffic change curve of the traffic intersection by performing calculation on the first traffic characteristic at each of the plurality of target positions based on a preset function; determine a target value of each of a plurality of target points on the traffic change curve; and generate the first traffic change information based on the target value of each of the plurality of target points.

The second generation module 30 is configured to, in response to that the first traffic change information satisfies a preset first change distribution, generate channelization adjustment information for non-motorized vehicle lanes of the traffic intersection.

Figure 8:
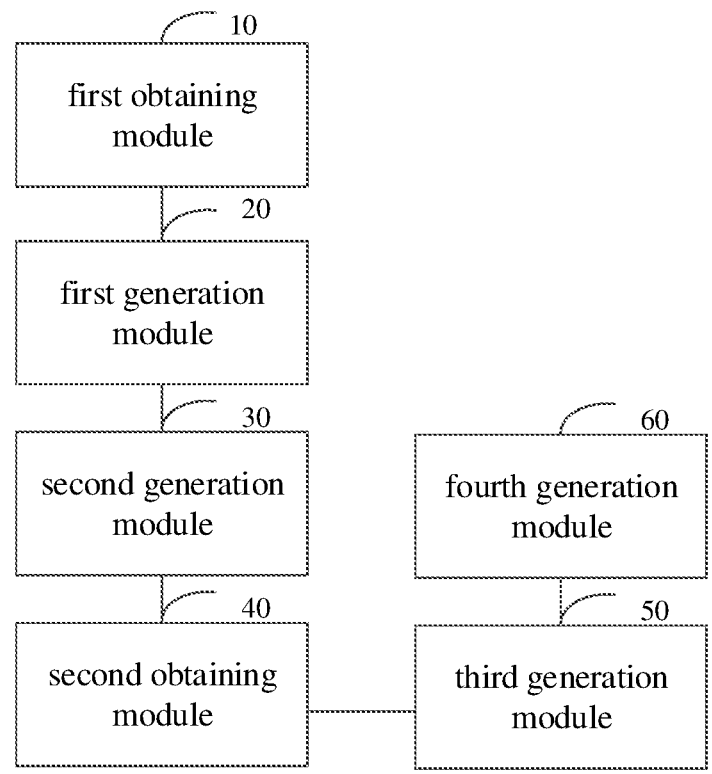
FIG. 8 is a block diagram illustrating an apparatus for adjusting channelization of a traffic intersection according to Embodiment 8 of the present disclosure.

In an embodiment of the present disclosure, as illustrated in FIG. 8 and on the basis of FIG. 7, the apparatus further includes a second obtaining module 40, a third generation module 50 and a fourth generation module 60.

The second obtaining module 40 is configured to, in response to that the first traffic change information satisfies a preset second change distribution, obtain a second traffic characteristic of vehicles at each of the plurality of target positions in the process of the vehicles in the target traveling direction traveling through the traffic intersection from upstream to downstream in a preset second time period.

The third generation module 50 is configured to generate second traffic change information of the traffic intersection based on the second traffic characteristic at each of the plurality of target positions.

The fourth generation module 60 is configured to compare the first traffic change information with the second traffic change information, and in response to a difference between the first traffic change information and the second traffic change information being greater than a preset threshold, generate adjustment information for an information control device of the traffic intersection.

It should be noted that the foregoing explanation of the method for adjusting channelization of the traffic intersection is also applicable to the apparatus for adjusting channelization of the traffic intersection according to embodiments of the present disclosure. The implementation of the apparatus is similar to the implementation of the method, and thus will not be repeated here.

In summary, with the apparatus for adjusting channelization of the traffic intersection according to embodiments of the present disclosure, the first traffic characteristic at each of the plurality of target positions in the process of the vehicles in the target traveling direction traveling through the traffic intersection from upstream to downstream in the preset first time period is obtained. The first traffic change information of the traffic intersection is generated based on the first traffic characteristic at each of the plurality of target positions. In response to that the first traffic change information satisfies the preset first change distribution, the channelization adjustment information is generated for the non-motorized vehicle lanes of the traffic intersection. Consequently, the intelligent detection of an unreasonable traffic direction of channelization of the non-motorized vehicle is realized without manual work, and the efficiency of the channelization adjustment for the non-motorized vehicle is improved.

According to embodiments of the present disclosure, the present disclosure also provides an electronic device and a readable storage medium.

Figure 9:
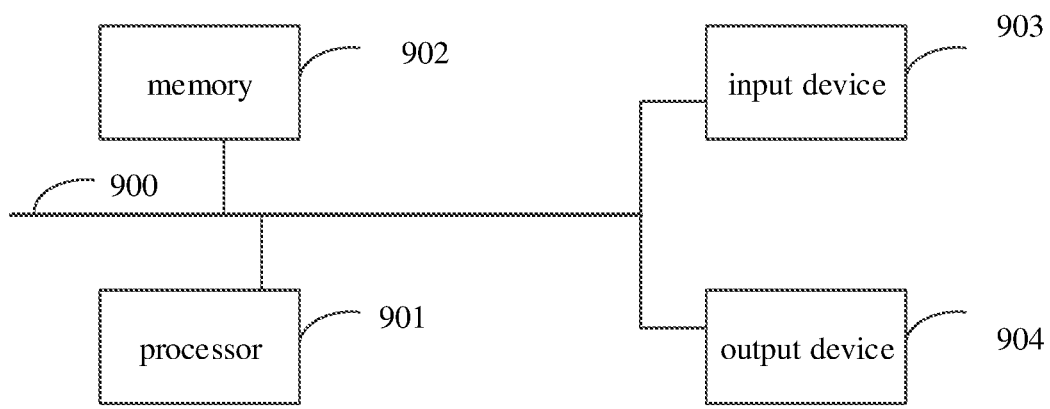
FIG. 9 is a block diagram illustrating an electronic device configured to implement a method for adjusting channelization of a traffic intersection according to embodiments of the present disclosure.

FIG. 9 is a block diagram illustrating an electronic device configured to implement a method for adjusting channelization of a traffic intersection according to embodiments of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 9, the electronic device includes: one or more processors 901, a memory 902, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 901 is taken as an example in FIG. 9.

The memory 902 is a non-transitory computer-readable storage medium according to the embodiments of the present disclosure. The memory stores instructions executable by at least one processor, so that the at least one processor executes the method for adjusting channelization of the traffic intersection provided by the present disclosure. The non-transitory computer-readable storage medium according to the present disclosure stores computer instructions, which are configured to make the computer execute the method for adjusting channelization of the traffic intersection provided by the present disclosure.

As a non-transitory computer-readable storage medium, the memory 902 may be configured to store non-transitory software programs, non-transitory computer executable programs and modules, such as program instructions/modules (for example, the first obtaining module 10, the first generation module 20 and the second generation module 30 illustrated in FIG. 7) corresponding to the method for adjusting channelization of the traffic intersection according to embodiments of the present disclosure. The processor 901 executes various functional applications and performs data processing of the server by running non-transitory software programs, instructions and modules stored in the memory 902, that is, the method for adjusting channelization of the traffic intersection according to the foregoing method embodiments is implemented.

The memory 902 may include a storage program area and a storage data area, where the storage program area may store an operating system and applications required for at least one function; and the storage data area may store data created according to the use of the electronic device that implements the method for adjusting channelization of the traffic intersection, and the like. In addition, the memory 902 may include a high-speed random access memory, and may further include a non-transitory memory, such as at least one magnetic disk memory, a flash memory device, or other non-transitory solid-state memories. In some embodiments, the memory 902 may optionally include memories remotely disposed with respect to the processor 901, and these remote memories may be connected to the electronic device, which is configured to implement the method for adjusting channelization of the traffic intersection, through a network. Examples of the network include, but are not limited to, the Internet, an intranet, a local area network, a mobile communication network, and combinations thereof.

The electronic device configured to implement the method for adjusting channelization of the traffic intersection may further include an input device 903 and an output device 904. The processor 901, the memory 902, the input device 903 and the output device 904 may be connected through a bus or in other manners. FIG. 9 is illustrated by establishing the connection through a bus.

The input device 903 may receive input numeric or character information, and generate key signal inputs related to user settings and function control of the electronic device configured to implement the method for adjusting channelization of the traffic intersection, such as a touch screen, a keypad, a mouse, a trackpad, a touchpad, a pointing stick, one or more mouse buttons, trackballs, joysticks and other input devices. The output device 904 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for adjusting channelization of a traffic intersection, comprising:
    obtaining a first traffic characteristic of vehicles at each of a plurality of target positions in a process of vehicles in a target traveling direction traveling through the traffic intersection from upstream to downstream in a preset first time period;
    generating first traffic change information of the traffic intersection based on the first traffic characteristic at each of the plurality of target positions; and
    in response to that the first traffic change information satisfies a preset first change distribution, generating channelization adjustment information for non-motorized vehicle lanes of the traffic intersection,
    wherein generating the first traffic change information of the traffic intersection based on the first traffic characteristic of the vehicles at each of the plurality of target positions comprises:
    generating a traffic change curve of the traffic intersection by performing calculation on the first traffic characteristic at each of the plurality of target positions based on a preset function;
    determining a target value of each of a plurality of target points on the traffic change curve; and
    generating the first traffic change information based on the target value of each of the plurality of target points.

2. The method of claim 1, wherein obtaining the first traffic characteristic of the vehicles at each of the plurality of target positions in the process of the vehicles in the target traveling direction traveling through the traffic intersection from upstream to downstream in the preset first time period comprises:
    analyzing a video of the traffic intersection to extract global positioning system (GPS) trajectory data comprising a position characteristic and a time characteristic of the vehicles in the target traveling direction;
    obtaining target GPS trajectory data indicating traveling through the traffic intersection with a green light on in the first time period based on the time characteristic; and
    calculating a speed characteristic corresponding to each of the plurality of target positions based on a position characteristic and a time characteristic of the target GPS trajectory data, the plurality of target positions comprising an upstream exit position, an intersection center position, and a downstream entrance position.

3. The method of claim 1, further comprising:
    in response to that the first traffic change information satisfies a preset second change distribution, obtaining a second traffic characteristic of vehicles at each of the plurality of target positions in the process of the vehicles in the target traveling direction traveling through the traffic intersection from upstream to downstream in a preset second time period;

generating second traffic change information of the traffic intersection based on the second traffic characteristic at each of the plurality of target positions;

comparing the first traffic change information with the second traffic change information; and in response to a difference between the first traffic change information and the second traffic change information being greater than a preset threshold, generating adjustment information for an information control device of the traffic intersection.

4. The method of claim 3, after comparing the first traffic change information with the second traffic change information, further comprising:

in response to the difference between the first traffic change information and the second traffic change information being less than or equal to the preset threshold, generating lane adjustment information of the traffic intersection.

5. An electronic device, comprising:

at least one processor; and a storage device including a memory communicatively connected to the at least one processor, wherein the memory stores an instruction executable by the at least one processor, and when the instruction is executed by the at least one processor, the at least one processor implement a method for adjusting channelization of the traffic intersection, wherein the method comprises:

obtaining a first traffic characteristic of vehicles at each of a plurality of target positions in a process of vehicles in a target traveling direction traveling through the traffic intersection from upstream to downstream in a preset first time period;

generating first traffic change information of the traffic intersection based on the first traffic characteristic at each of the plurality of target positions; and in response to that the first traffic change information satisfies a preset first change distribution, generating channelization adjustment information for non-motorized vehicle lanes of the traffic intersection, wherein generating the first traffic change information of the traffic intersection based on the first traffic characteristic of the vehicles at each of the plurality of target positions comprises:

generating a traffic change curve of the traffic intersection by performing calculation on the first traffic characteristic at each of the plurality of target positions based on a preset function;

determining a target value of each of a plurality of target points on the traffic change curve; and generating the first traffic change information based on the target value of each of the plurality of target points.

6. The electronic device of claim 5, wherein obtaining the first traffic characteristic of the vehicles at each of the plurality of target positions in the process of the vehicles in the target traveling direction traveling through the traffic intersection from upstream to downstream in the preset first time period comprises:

analyzing a video of the traffic intersection to extract global positioning system (GPS) trajectory data comprising a position characteristic and a time characteristic of the vehicles in the target traveling direction;

obtaining target GPS trajectory data indicating traveling through the traffic intersection with a green light on in the first time period based on the time characteristic; and calculating a speed characteristic corresponding to each of the plurality of target positions based on a position characteristic and a time characteristic of the target GPS trajectory data, the plurality of target positions comprising an upstream exit position, an intersection center position, and a downstream entrance position.

7. The electronic device of claim 5, further comprising:

in response to that the first traffic change information satisfies a preset second change distribution, obtaining a second traffic characteristic of vehicles at each of the plurality of target positions in the process of the vehicles in the target traveling direction traveling through the traffic intersection from upstream to downstream in a preset second time period;

generating second traffic change information of the traffic intersection based on the second traffic characteristic at each of the plurality of target positions;

comparing the first traffic change information with the second traffic change information; and in response to a difference between the first traffic change information and the second traffic change information being greater than a preset threshold, generating adjustment information for an information control device of the traffic intersection.

8. The electronic device of claim 7, after comparing the first traffic change information with the second traffic change information, further comprising:

in response to the difference between the first traffic change information and the second traffic change information being less than or equal to the preset threshold, generating lane adjustment information of the traffic intersection.

9. A non-transitory computer-readable storage medium having a computer instruction stored thereon, wherein the computer instruction is configured to make a computer implement a method for adjusting channelization of the traffic intersection, the method comprising:

obtaining a first traffic characteristic of vehicles at each of a plurality of target positions in a process of vehicles in a target traveling direction traveling through the traffic intersection from upstream to downstream in a preset first time period;

generating first traffic change information of the traffic intersection based on the first traffic characteristic at each of the plurality of target positions; and in response to that the first traffic change information satisfies a preset first change distribution, generating channelization adjustment information for non-motorized vehicle lanes of the traffic intersection, wherein generating the first traffic change information of the traffic intersection based on the first traffic characteristic of the vehicles at each of the plurality of target positions comprises:

generating a traffic change curve of the traffic intersection by performing calculation on the first traffic characteristic at each of the plurality of target positions based on a preset function;

determining a target value of each of a plurality of target points on the traffic change curve; and generating the first traffic change information based on the target value of each of the plurality of target points.

10. The storage medium of claim 9, wherein obtaining the first traffic characteristic of the vehicles at each of the plurality of target positions in the process of the vehicles in the target traveling direction traveling through the traffic intersection from upstream to downstream in the preset first time period comprises:

analyzing a video of the traffic intersection to extract global positioning system (GPS) trajectory data comprising a position characteristic and a time characteristic of the vehicles in the target traveling direction;

obtaining target GPS trajectory data indicating traveling through the traffic intersection with a green light on in the first time period based on the time characteristic; and calculating a speed characteristic corresponding to each of the plurality of target positions based on a position characteristic and a time characteristic of the target GPS trajectory data, the plurality of target positions comprising an upstream exit position, an intersection center position, and a downstream entrance position.

11. The storage medium of claim 9, the method further comprising:

in response to that the first traffic change information satisfies a preset second change distribution, obtaining a second traffic characteristic of vehicles at each of the plurality of target positions in the process of the vehicles in the target traveling direction traveling through the traffic intersection from upstream to downstream in a preset second time period;

generating second traffic change information of the traffic intersection based on the second traffic characteristic at each of the plurality of target positions;

comparing the first traffic change information with the second traffic change information; and in response to a difference between the first traffic change information and the second traffic change information being greater than a preset threshold, generating adjustment information for an information control device of the traffic intersection.

12. The storage medium of claim 11, after comparing the first traffic change information with the second traffic change information, the method further comprising:

in response to the difference between the first traffic change information and the second traffic change information being less than or equal to the preset threshold, generating lane adjustment information of the traffic intersection.

* * * * *